United States Patent
Roberts et al.

(10) Patent No.: US 10,004,982 B1
(45) Date of Patent: Jun. 26, 2018

(54) ALTERABLE TOKEN DEVICES

(71) Applicant: Performance Designed Products LLC, Burbank, CA (US)

(72) Inventors: Tom Roberts, Alpine, CA (US); Steven Lavache, Ware (GB)

(73) Assignee: Performance Designed Products LLC, Burbank, CA (US)

( * ) Notice: Subject to any disclaimer, the term of this patent is extended or adjusted under 35 U.S.C. 154(b) by 256 days.

(21) Appl. No.: 15/156,189

(22) Filed: May 16, 2016

Related U.S. Application Data

(60) Provisional application No. 62/162,592, filed on May 15, 2015.

(51) Int. Cl.
*A63F 13/235* (2014.01)
*G06K 19/07* (2006.01)
*A63F 13/77* (2014.01)

(52) U.S. Cl.
CPC .......... *A63F 13/235* (2014.09); *A63F 13/77* (2014.09); *G06K 19/0726* (2013.01)

(58) Field of Classification Search
CPC .... A63F 13/235; A63F 13/77; G06K 19/0726
USPC .......................................................... 463/29
See application file for complete search history.

(56) References Cited

U.S. PATENT DOCUMENTS

| | | | | |
|---|---|---|---|---|
| 9,843,851 | B2* | 12/2017 | Chamberlin | H04R 1/028 |
| 2004/0162127 | A1* | 8/2004 | Siegel | A63F 5/04 463/9 |
| 2012/0306661 | A1* | 12/2012 | Xue | G05B 19/042 340/870.02 |
| 2015/0195489 | A1* | 7/2015 | Sobti | H04N 7/142 348/14.08 |

* cited by examiner

*Primary Examiner* — Allen Chan
(74) *Attorney, Agent, or Firm* — Sheppard, Mullin, Richter & Hampton LLP; Daniel Yannuzzi; Mike Kim

(57) ABSTRACT

Various embodiments described herein are directed toward alterable tokens. The alterable token may include a base including an RFID pattern. The base may include an electrical contact electrically coupled to the RFID pattern. The alterable token may include a rotatable body mounted to the base. The body may include first and second RFID tags. The body may include a first electrical contact coupled to the first RFID tag and a second electrical contact coupled to the second RFID tag. The body may be rotatable to a first and a second position. The RFID pattern may be electrically coupled to the first RFID tag when the first electrical contact contacts the electrical contact of the base in the first position. The RFID pattern may be electrically coupled to the second RFID tag when the second electrical contact contacts the electrical contact of the base in the second position.

54 Claims, 8 Drawing Sheets

ALTERABLE TOKEN DEVICES

CROSS-REFERENCE TO RELATED APPLICATIONS

This application claims the benefit of U.S. Provisional Application No. 62/162,592 filed May 15, 2015, and which is hereby incorporated herein by reference in its entirety.

FIELD OF THE INVENTION(S)

The present invention relates to tokens and other devices, and, more particularly, some embodiments relate to an alterable device configured to include unique instances of RFID tags.

DESCRIPTION OF THE RELATED ART

The use of RFID devices have a history of use in communicating information between various devices in many industries. For example, in a video game environment, a video game platform may include an RFID or other like interface for communicating with various gaming tokens, input devices, controllers, etc. In such an environment, the gaming tokens may include an RFID device. The RFID device may be used to identify individual gaming tokens. When the user places his or her token on an RFID platform, the platform may identify the token and information stored on the token. For example, the token may be associated with a particular gaming character. A single token may represent a single gaming character. For example, swapping one token for another may allow a user to change characters in the game.

In other applications, tokens including RFID or like devices may be used to identify a user or particular goods in a particular environment. For example, tokens have been used to identify individuals. For example, tokens may be used to allow individuals to access buildings or areas within buildings, pay for goods, board public transportation. Tokens have likewise been used to identify equipment or other items and to track items through an environment.

BRIEF SUMMARY OF EMBODIMENTS

Various embodiments of the invention(s) described herein are directed toward alterable tokens, and more specifically, toward alterable tokens including a plurality of identification structures such as, for example, RFID tags. According to various embodiments, the alterable token may be communicatively couplable to an external device, such as a token reader/writer that is capable of reading the information in the identification structures. Examples of equipment or devices that can utilize a token reader/writer can include, a gaming console or gaming platform, access points or entryways, payment terminals or devices, electronically keyed equipment or machinery, and so on. The alterable token may be communicatively couplable to the external device over a wired or wireless communication interface.

According to one embodiment, the alterable RFID device may include a base and a rotatable body including a plurality of RFID tags. Depending on the embodiment of the gaming peripheral, the base may include a top portion and a bottom portion. The base may be provided in a variety of shapes, sizes, or forms, including a cylindrical or spherical base with a substantially flat upper surface.

The base may include one or more RFID patterns. The one or more RFID patterns may include a coil or other pattern of conductive material. The conductive material of the one or more RFID patterns may facilitate coupling with the external device for the transfer of power and/or communication of information between the plurality of RFID tags and the external device.

The rotatable body may be coupled to the top portion of the base. The rotatable body may be physically combined, coupled, connected, or otherwise detachably adjoined to the base to form the alterable token. In some embodiments, the rotatable body may be detachably mounted to the base via a locking mechanism, such as an electromagnetic locking mechanism or other locking mechanism. The rotatable body may attach to and detach from the base such that the rotatable body may be interchangeable.

The rotatable body may include any form, shape, or size. The rotatable body may be configured to rotate 360-degrees left or right around a vertical axis relative to the base. In some embodiments, the rotatable body may include a locking mechanism to releasably lock the rotatable body in a first position or a second position.

According to some embodiments, the rotatable body may include a plurality of RFID tags. Each of the RFID tags may include unique identification information. The unique identification information may include one or more attributes representing unique objects or characters of a video game. The one or more attributes representing unique characters may include a visual depiction of the unique characters, a strength level associated with the unique characters, an experience level associated with the unique characters, a wealth level associated with the unique characters, a health level associated with the unique characters, achievements associated with the unique characters, or other attributes associated with the unique characters. As such, a first RFID tag may represent a first character and a second RFID tag may represent a second character. The first character and the second character may be different.

In some embodiments, each of the RFID tags may be communicatively coupled to the one or more RFID patterns. This may enable communication between the RFID tag and the external device via the RFID pattern.

The one or more RFID patterns may be electrically coupled to the first RFID tag via a first electrical contact and an electrical contact of the base when the rotatable body is in the first position. The unique identification information associated with the first RFID tag may be communicated to the external device via the RFID pattern when the rotatable body is in the first position. The unique identification information associated with the first RFID tag may be communicated to the external device via the one or more RFID patterns when the rotatable body is in the first position.

In some embodiments, the one or more RFID patterns may be electrically coupled to the second RFID tag via a second electrical contact and the electrical contact of the base when the rotatable body is in the second position. The unique identification information associated with the second RFID tag may be communicated to the external device via the one or more RFID patterns when the rotatable body is in the second position.

In certain embodiments, the rotatable body may include additional RFID tags and additional electrical contacts. One RFID tag may correspond to one of the electrical contacts. The rotatable body may be configured to be rotatable to additional positions, such that one of the additional RFID tags will be communicatively coupled to the one or more RFID patterns when its corresponding electrical contact becomes in contact with the electrical contact of the base when the rotatable body is in a particular position.

In some embodiments, the first RFID tag may be communicatively couplable to the external device via the one or more RFID patterns when the first RFID tag is within proximity to the one or more RFID patterns in the first position. In some embodiments, the second RFID tag may be communicatively couplable to the external device via the one or more RFID patterns when the second RFID tag is within proximity to the one or more RFID patterns in the second position.

Other features and aspects of the systems, methods and apparatuses described herein will become apparent from the following detailed description, taken in conjunction with the accompanying drawings, which illustrate, by way of example, features in accordance with various embodiments. The summary is not intended to limit the scope of the invention(s), which is defined solely by the claims attached hereto.

BRIEF DESCRIPTION OF THE DRAWINGS

One or more various embodiments described herein are done so in detail with reference to the following figures. The drawings are provided for purposes of illustration only and merely depict typical or embodiments. These drawings are provided to facilitate the reader's understanding of various embodiments and shall not be considered limiting of the breadth, scope, or applicability of embodiments. It should be noted that for clarity and ease of illustration these drawings are not necessarily made to scale.

Some of the figures included herein illustrate various embodiments of the invention(s) from different viewing angles. Although the accompanying descriptive text may refer to such views as "top," "bottom" or "side" views, such references are merely descriptive and do not imply or require that the invention(s) be implemented or used in a particular spatial orientation unless explicitly stated otherwise.

Figure 1:
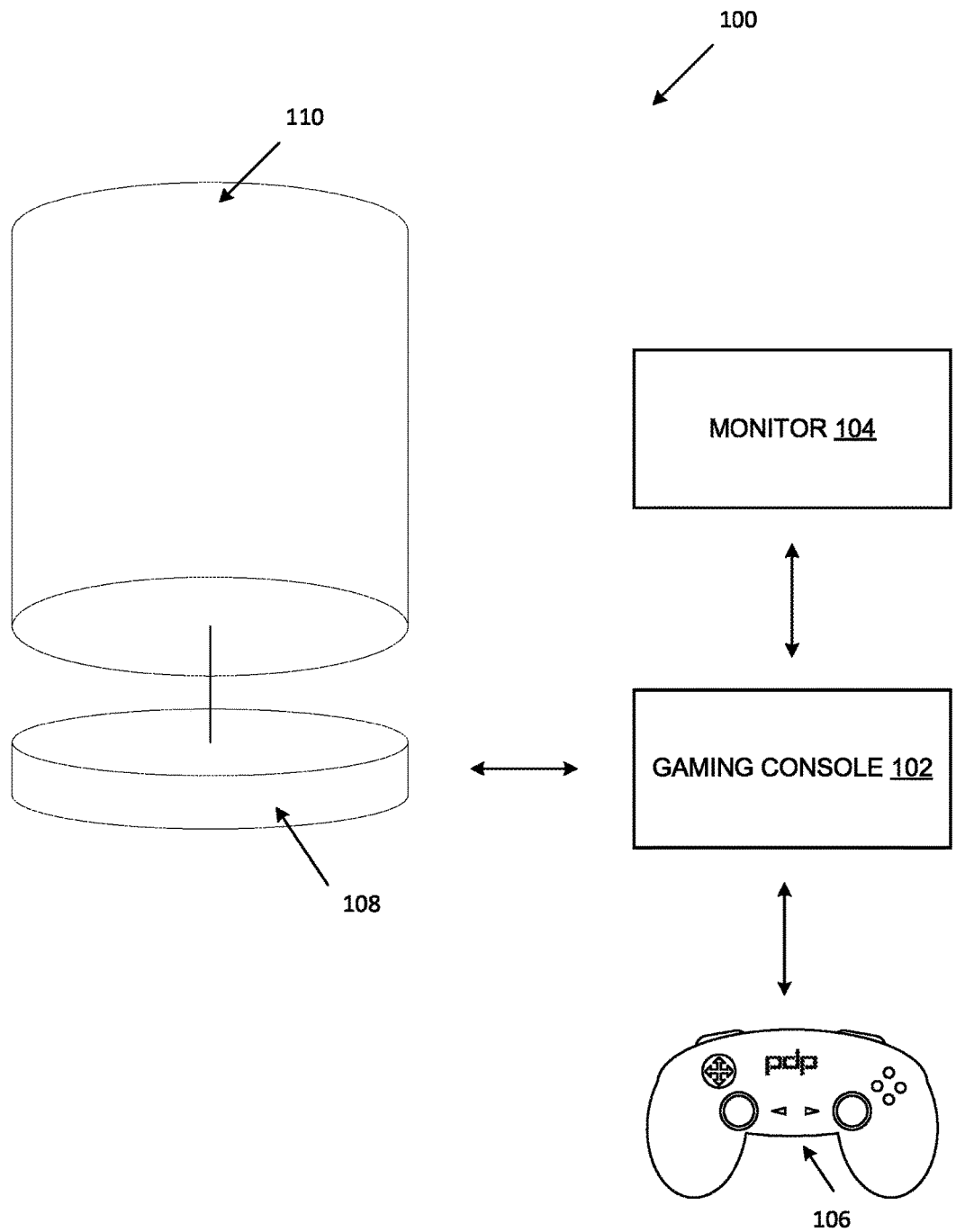
FIG. 1 is a block diagram illustrating a generalized version of a gaming system as one example of an environment with which various embodiments may be implemented.

The figures are not intended to be exhaustive or to limit various embodiments to the precise form disclosed. It should be understood that various embodiments can be practiced with modification and alteration, and that embodiments may be limited only by the claims and the equivalents thereof.

DETAILED DESCRIPTION

The present disclosure is directed toward an alterable token including a base portion and a body portion. In various embodiments, the base portion can include a communication interface to communicate with a token reader/writer. The body portion can include a plurality of information structures (e.g., RFID tags, integrated circuits, memory devices, etc.) and these information structures can be selectable such that the token can take on one or more of a plurality of identities.

In some embodiments, the base may include an RFID pattern to communicate with the token reader/writer. This RFID pattern can include an RFID antenna and RFID tuning elements to tune the resonant frequency of RFID pattern to that of the token reader/writer with which it communicates. In other embodiments, other communication interfaces can be provided to allow the alterable token to communicate with the token reader/writer with which it interfaces.

The rotatable body may include multiple RFID tags. Each of the RFID tags may include unique identification information. The unique identification information may include one or more attributes representing unique objects or characters of a video game. That is, each of the RFID tags may store information representing a different object or character to be included within a video game. Each of the RFID tags within the rotatable body may be electrically coupled to a single electrical contact within the rotatable body. The rotatable body may be rotatable to a first position and a second position relative to the base.

The RFID pattern may be electrically coupled to a first RFID tag when the body is rotated or positioned such that a first RFID tag comes in communicative contact with the RFID pattern of the base in the first position of the rotatable body. In this manner, the unique identification information (e.g., the one or more attributes representing the unique character or object) associated with the first RFID tag may be communicated to the RFID pattern. The RFID pattern may then communicate that information to an external device via a token reader/writer, such as a gaming platform or gaming console. The object or character associated with the first RFID tag may be included within gameplay. As the object or character loses or gains health, wealth, achievements, experience, etc. during gameplay, that information may be communicated from the external device to the RFID pattern. The RFID pattern may then communicate that information to the first RFID tag to be stored for later use of that object or character.

When a user wants to change the character or object, the user may simply rotate the rotatable body to the second position such that a second RFID tag may be communicatively coupled to the second RFID pattern of the base in the second position. The unique identification information (e.g., the one or more attributes representing the unique character or object) associated with the second RFID tag may then be communicated to the RFID pattern. The RFID pattern may then communicate that information to the external device for inclusion of the unique character or object into gameplay. As such, a single RFID device may represent several different objects or characters. The user may change objects or characters for gameplay by simply rotating the rotatable body of the RFID device.

Communicatively coupling the RFID pattern to the RFID tag selected by rotation of the body can be accomplished through wireless communication between the RFID tags and the RFID pattern, or through the use of electrical contacts to provide a hardwired electrical path between the RFID tags hand the RFID pattern.

Before describing the invention in detail it is useful to describe an example environment with which the invention may be implemented. One such example is that of a gaming system used by one or more video game players, or gamers, to play computer games or video games. FIG. 1 is a diagram illustrating a generalized version of gaming system 100 as one example of an environment with which the invention may be implemented. Referring now to FIG. 1, the example gaming system includes gaming console 102, a monitor 104, a gaming controller 106, and an alterable gaming token including a base 108 and a rotatable body 110.

In one environment, gaming console 102 might be implemented as a PlayStation®, Xbox®, Wii™ or other like gaming console. In another implementation, gaming console 102 may be implemented as a personal computer or other like computing device. Gaming console 102 may include a processor or other computing device providing the ability to allow gaming applications, including software applications, to be run thereon. A gaming application may be installed, for example, through the use of CD ROM drives, DVD drives, or other storage medium or communications interfaces. Typically, gaming console 102 may be analogized to a computer or computing system to run the gaming software. In another environment, gaming console 102 may be implemented as a personal computer.

Monitor 104 may be provided to allow the gaming environment to display to the gamer during play of the video game. Monitor 104 may also be used to display menus and other features to the gamer to enhance the game play environment. Various interfaces may be provided between gaming console 102 and monitor 104 to provide the proper video signal to drive monitor 104. For example, RGB, NTSC, VGA, and other signal types or specifications may be used to provide communications between gaming console 102 and monitor 104. Audible information may include a chat between gamers in remote locations, music and sounds associated with the video game, etc.

Although not illustrated, speakers may also be provided with monitor 104 to provide audible information to the gamer during play of the video game and during set up. For example, in one embodiment, monitor 104 might be implemented as a television with built in speakers that may be connected to gaming console 102 via a coaxial or other audio and video input.

Also illustrated in the example environment is gaming controller 106 that may be used to allow gamers to provide input to the game software as well as to receive feedback from the game software during set up and game play. Controller 106 may include, for example, X, Y, A, B buttons, trigger buttons, analog joysticks, key pads, and other devices to allow the user to provide input to the video game. Thus by actuating the various buttons, switches or joysticks, the gamer may control the operation of the video game or control characters or vehicles within the video game. The interface between controller 106 and gaming console 102 may be either wired and/or wireless interfaces as may be desired. Likewise, throughout this document, references to communication or signal interfaces may be implemented using wired or wireless interfaces, unless otherwise specified. Gaming system 100 may include more than one controller 106 so that multiple players may play.

While not depicted in FIG. 1, a communications connection may be provided from gaming system 100 to a network. For example, a user may wish to connect gaming console 102 to the internet or other communication medium whereby game information may be downloaded or uploaded to various websites, online services such as Xbox Live™, or other entities or services. Also, through the communication medium, gamers might compete amongst other gamers at their gaming systems, even if such other gamers are located at remote or distant locations. Note that depending on the gaming environment, remote gaming systems may or may not have similar configurations to one another.

The alterable token may include a base 108. Base 108 may be communicatively couplable to gaming console 102. As will be discussed in further detail below, base 108 may include an RFID pattern. The RFID pattern may be used to electromagnetically and communicatively couple base 108 to gaming console 102.

The alterable token may include a rotatable body 110 disposed on top of the base 108. As will be discussed in further detail below, rotatable body 110 may include a plurality of RFID tags storing unique identification information. The unique identification information of the RFID tags within rotatable body 110 may be communicated to gaming console 102 via the RFID pattern of base 108. Information, including updates to the unique identification information stored within rotatable body 110, may by communicated from gaming console 102 to rotatable body 110 via the RFID pattern of base 108. As such, the alterable token may allow for one or two-way communication with the external device.

It should be understood by those of ordinary skill in the art that environments described above allow the various features and embodiments of the invention to be portrayed in the context of an exemplary application. After reading this description, it will become apparent to one of ordinary skill in the art how embodiments of the invention may be implemented in different alternative environments, including using an alterable token to communicate with other devices other than gaming systems.

As noted above, embodiments of the alterable token include a base and a body that rotate relative to one another to allow one of a plurality of information structures (e.g., RFID tags, chips, memory devices, etc.) to be put into communicative contact with the base such that information in the selected information structure can be read by a token reader/writer written to by a token reader/writer or both. As noted above, the communication interface between the base and the body can be a wireless or hard wired communication interface. Example embodiments of each a wired and a wireless communication interface are described.

Figure 2:
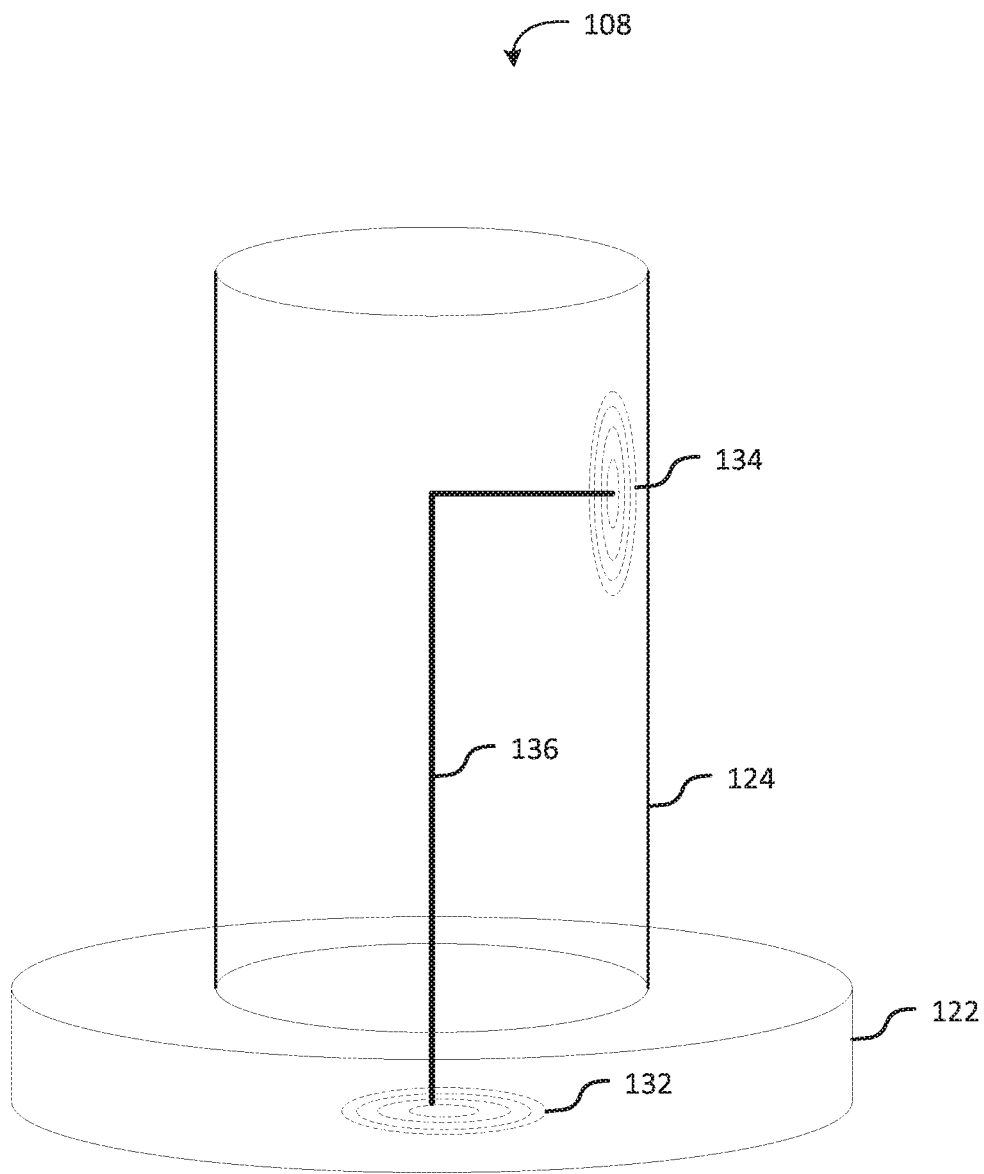
FIG. 2 is a diagram illustrating an example of a base of an alterable token in accordance with one embodiment of the systems and methods disclosed herein.
Figure 3:
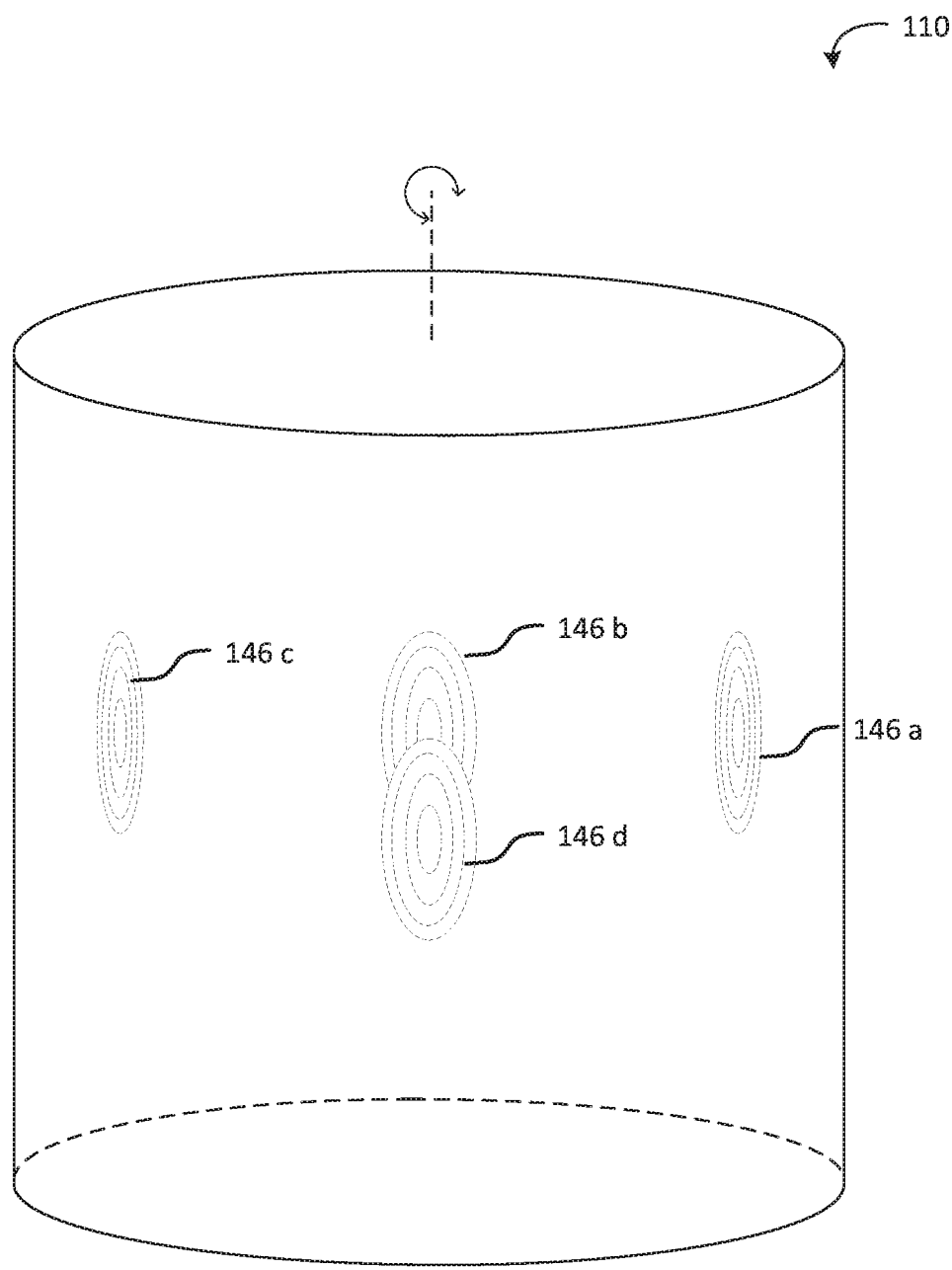
FIG. 3 is a diagram illustrating an example of a rotatable body in accordance with one embodiment of the systems and methods disclosed herein.
Figure 4:
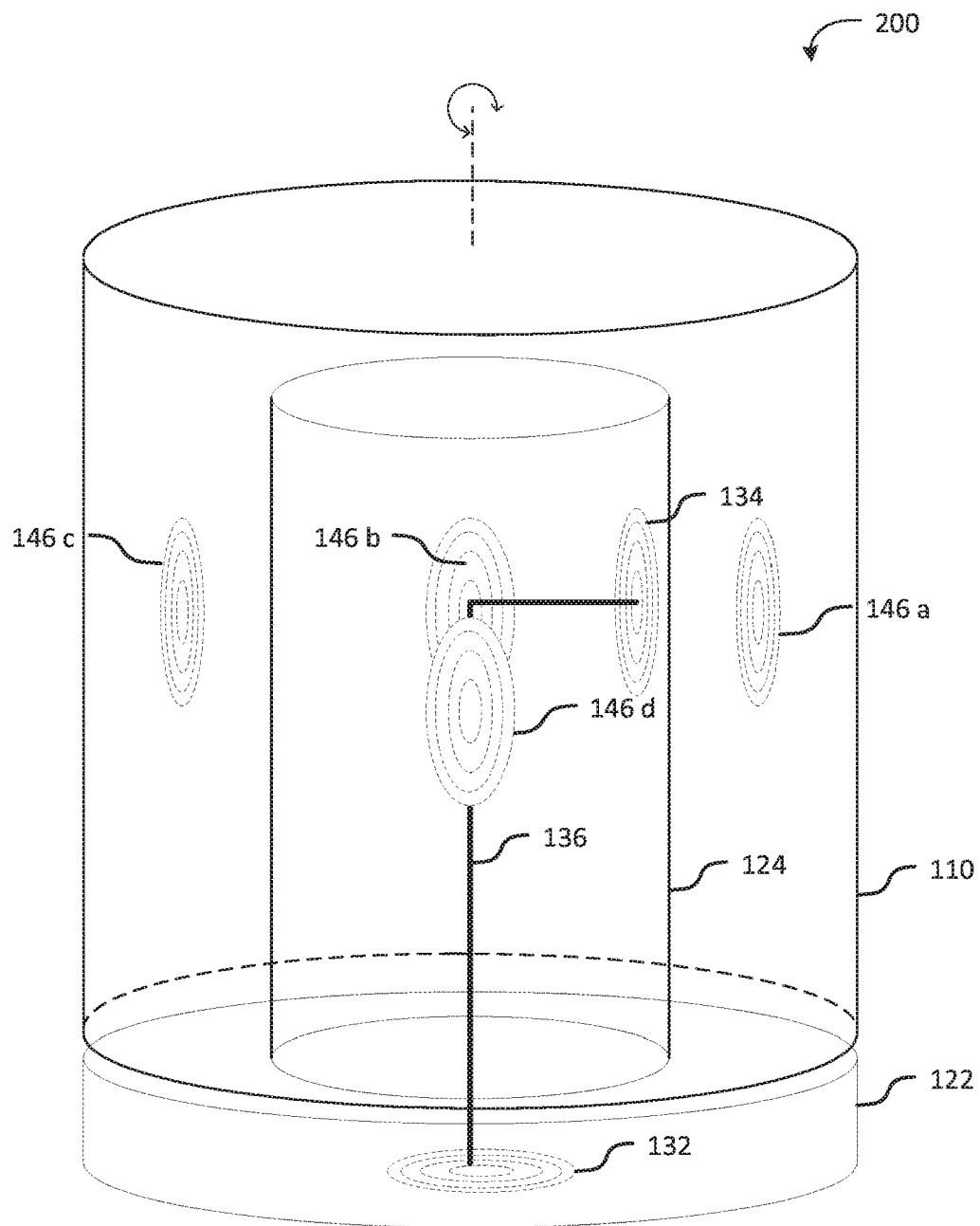
FIG. 4 is a diagram illustrating an example of an alterable token comprising the example base illustrated in FIG. 2 coupled with the example rotatable body illustrated in FIG. 3.

FIG. 2 is a diagram illustrating an example of a base of an alterable token in accordance with one embodiment of the systems and methods disclosed herein. FIG. 3 is a diagram illustrating an example of a rotatable body in accordance with one embodiment of the systems and methods disclosed herein. FIG. 4 is a diagram illustrating an example of an alterable token 200 comprising the example base illustrated in FIG. 2 coupled with the example rotatable body illustrated in FIG. 3.

Referring now to FIGS. 2, 3 and 4, this example alterable token is now described. As seen in this example embodiment at FIG. 2, base 108 includes a lower base portion 122 and an upper base portion 124, a first RFID pattern 132 in lower base portion 122, a second RFID pattern 134 in upper base portion 124, and a communication interface 136 communicatively coupling first RFID pattern 132 to second RFID pattern 134. As illustrated, in this example RFID pattern 132 is disposed within or on the bottom of lower base portion 122 such that RFID pattern 132 can be wirelessly communicatively coupled to the token reader/writer of the external device (e.g. of the gaming platform). RFID pattern 134 is positioned in upper base portion 124 such that it can be wirelessly communicatively coupled to rotatable body 110 as described with reference to FIG. 4.

Communication interface 136 can be implemented as any communication link communicatively coupling RFID pattern 132 with RFID pattern 134. This can be implemented, for example, as a single conductor (e.g., copper, silver, or other conductive wire, printed trace, line, etc.) or as a shielded conductor (e.g., coaxial cable, twisted-pair, etc.). In various embodiments, communication interface 136 is implemented to allow information received by RFID pattern 134 to travel to and be transmitted by RFID pattern 132; and, likewise, to allow information received by RFID pattern 132 to travel to and be transmitted by RFID pattern 134.

With reference now to FIG. 3, rotatable body 110 in this environment includes a rotatable body 110 and a plurality of RFID tags 146a, 146b, 146c, and 146d. Rotatable body 110 may be configured as a hollow cylindrical structure dimensioned so as to fit over and rotate about upper base portion 124. RFID tags 146a, 146b, 146c, and 146d may be disposed about rotatable body 110. In the illustrated example there are four RFID tags 146a, 146b, 146c, and 146d spaced equally about the perimeter of rotatable body 110 at substantially 90° intervals. This corresponds to embodiments in which the alterable token can be rotated to select one of four characters (or other attributes in other environments).

With reference now to FIG. 4, the example assembled token is depicted, showing rotatable body 110 positioned over upper base portion 124. In this assembled configuration, it can be seen that RFID tags 146a, 146b, 146c, and 146d are approximately or substantially at the same height as RFID pattern 134. As further seen in this example, the RFID tags 146 are positioned such that when rotatable body 110 is rotated relative to base 108, a selected one of the plurality of RFID tags 146a, 146b, 146c, and 146d is brought into proximity with RFID pattern 134. Upper base portion 124 and rotatable body 110 are appropriately dimensioned (and RFID pattern 134 and RFID tags 146, respectively appropriately placed) such that wireless communication can take place between RFID pattern 134 and the selected one of the plurality of RFID tags 146a, 146b, 146c, and 146d. In the example illustrated in FIG. 4, the body portions are rotated relative to one another such that RFID tag 146a is positioned proximal to RFID pattern 134 and these two devices can communicate with one another. Accordingly, information structures within RFID tag 146a can communicate information (e.g., read, write, or both) with the token reader/writer using RFID pattern 134, communication interface 136 and RFID pattern 132 as a communication conduit to communicatively couple RFID tag 146a with the token reader/writer.

Figure 5:
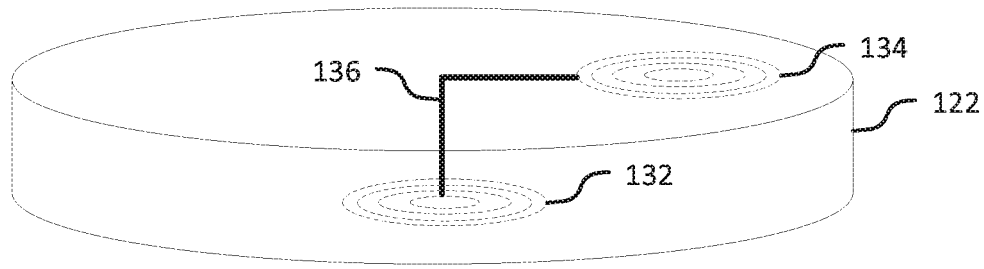
FIG. 5 is a diagram illustrating an example of a base of an alterable token in accordance with one embodiment of the systems and methods disclosed herein.
Figure 6:
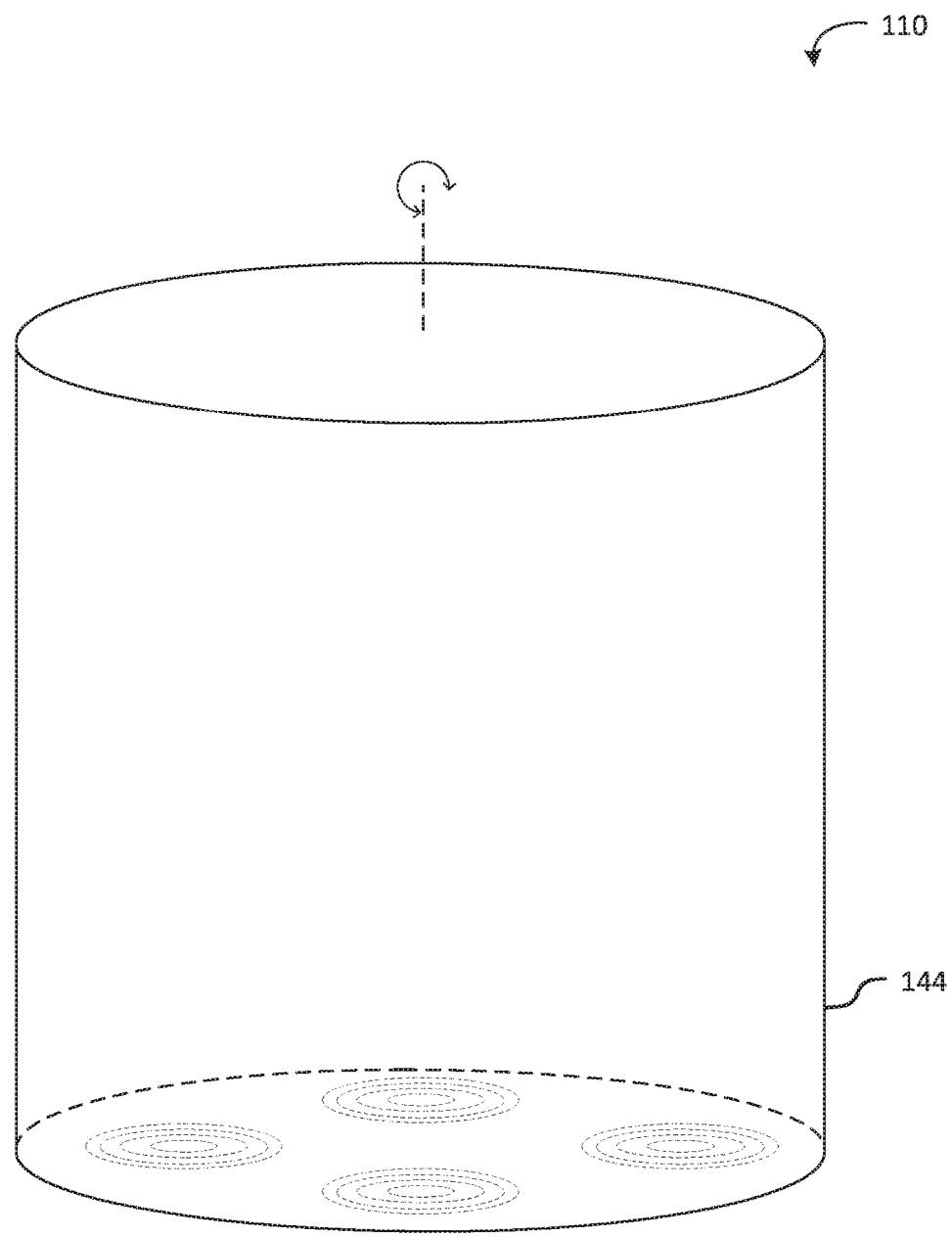
FIG. 6 is a diagram illustrating an example of a rotatable body in accordance with one embodiment of the systems and methods disclosed herein.
Figure 7:
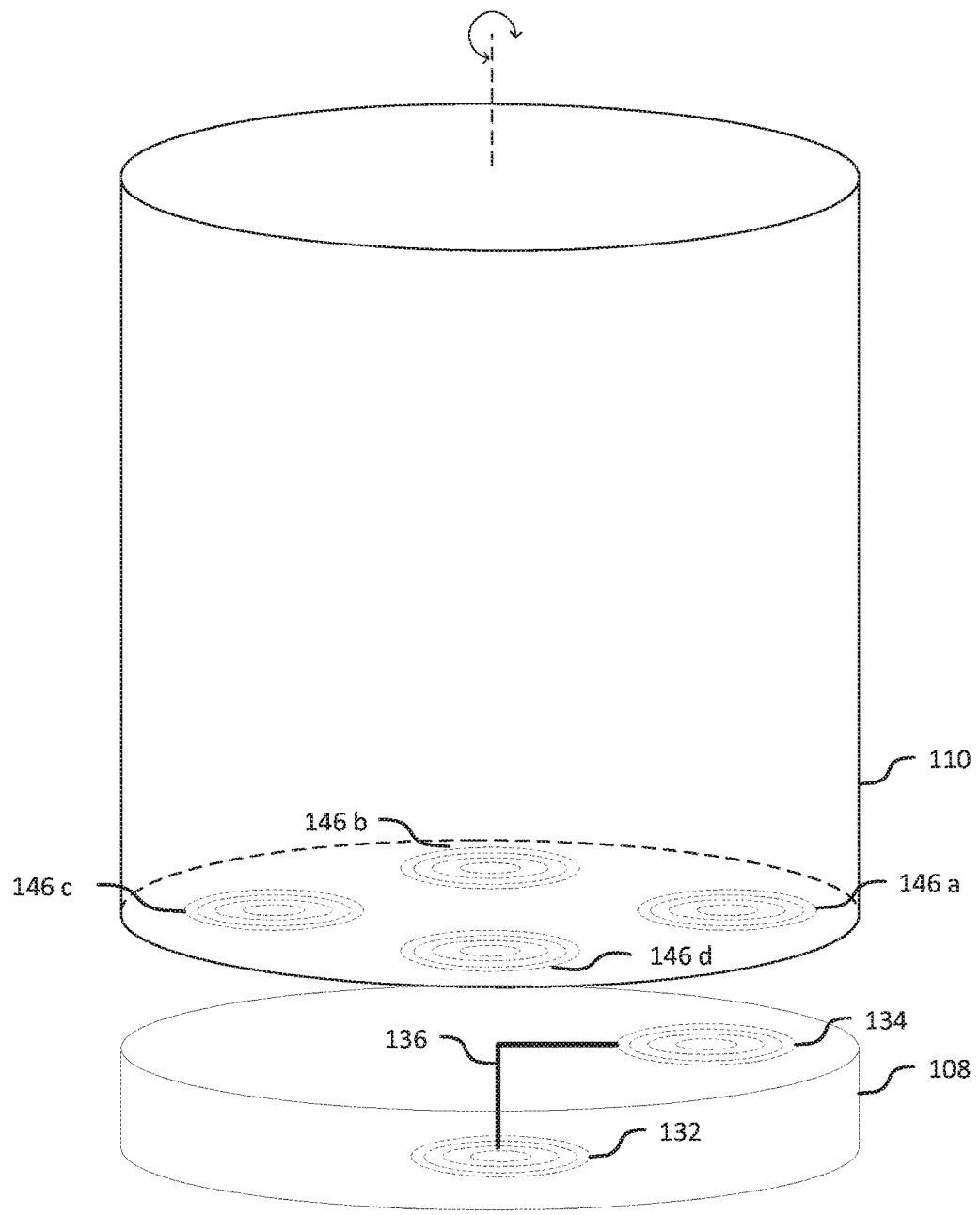
FIG. 7 is a diagram illustrating an example of an alterable token comprising the example base illustrated in FIG. 5 coupled with the example rotatable body illustrated in FIG. 6.

FIG. 5 is a diagram illustrating an example of a base of an alterable token in accordance with one embodiment of the systems and methods disclosed herein. FIG. 6 is a diagram illustrating an example of a rotatable body in accordance with one embodiment of the systems and methods disclosed herein. FIG. 7 is a diagram illustrating an example of an alterable token 200 comprising the example base illustrated in FIG. 5 coupled with the example rotatable body illustrated in FIG. 6.

Referring now to FIGS. 5, 6 and 7, this example alterable token is now described. As seen in this example embodiment at FIG. 5, base 108 includes a first RFID pattern 132 disposed in the bottom portion of base 108, a second RFID pattern 134 disposed in the upper portion of base 108 and a communication interface 136 communicatively coupling first RFID pattern 132 to second RFID pattern 134. As illustrated, in this example RFID pattern 132 is disposed within or on the bottom of base 108 such that RFID pattern 132 can be wirelessly communicatively coupled to the token reader/writer of the external device (e.g. of the gaming platform). RFID pattern 134 is positioned in the upper portion of base 108 such that it can be wirelessly communicatively coupled to rotatable body 110 as described with reference to FIG. 7.

Communication interface 136 can be implemented as any communication link communicatively coupling RFID pattern 132 with RFID pattern 134. This can be implemented, for example, as a single conductor (e.g., copper, silver, or other conductive wire, printed trace, line, etc.) or as a shielded conductor (e.g., coaxial cable, twisted-pair, etc.). In various embodiments, communication interface 136 is implemented to allow information received by RFID pattern 134 to travel to and be transmitted by RFID pattern 132; and, likewise, to allow information received by RFID pattern 132 to travel to and be transmitted by RFID pattern 134.

Referring now to FIG. 6, rotatable body 110 may be dimensioned such that it can be coupled to base 108. RFID tags 146a, 146b, 146c, and 146d are disposed about rotatable body 110. In the illustrated example there are four RFID tags 146a, 146b, 146c, and 146d spaced equally about the lower portion of rotatable body 110 at substantially 90° intervals. This corresponds to embodiments in which the alterable token can be rotated to select one of four characters (or other attributes in other environments).

With reference now to FIG. 7, the example assembled token is depicted, showing rotatable body 110 positioned proximal to the upper portion of base 108. Although the drawings are necessarily not to scale, it is noted that the spacing between rotatable body 110 and base 108 is exaggerated in the drawing for clarity of illustration. In various embodiments, base 108 and rotatable body 110 will be positioned sufficiently close to one another in the assembled configuration such that wireless communication and data transfer can occur between RFID pattern 134 and the selected one of the plurality of RFID tags 146

In this assembled configuration, it can be seen that RFID tags 146a, 146b, 146c, and 146d are positioned such that when rotatable body 110 is rotated relative to base 108, a selected one of the plurality of RFID tags 146a, 146b, 146c, and 146d is brought into proximity with RFID pattern 134. Upper base portion 124 and rotatable body 110 are appropriately dimensioned (and RFID pattern 134 and RFID tags 146, respectively appropriately placed) such that wireless communication can take place between RFID pattern 134 and the selected one of the plurality of RFID tags 146a, 146b, 146c, and 146d. In the example illustrated in FIG. 7, the base 108 and rotatable body 110 are rotated relative to one another such that RFID tag 146a is positioned proximal to RFID pattern 134 and these two devices can communicate with one another. Accordingly, information structures within RFID tag 146a can communicate information (e.g., read, write, or both) with the token reader/writer using RFID pattern 134, communication interface 136 and RFID pattern 132 as a communication conduit to communicatively couple RFID tag 146a with the token reader/writer.

Figure 8:
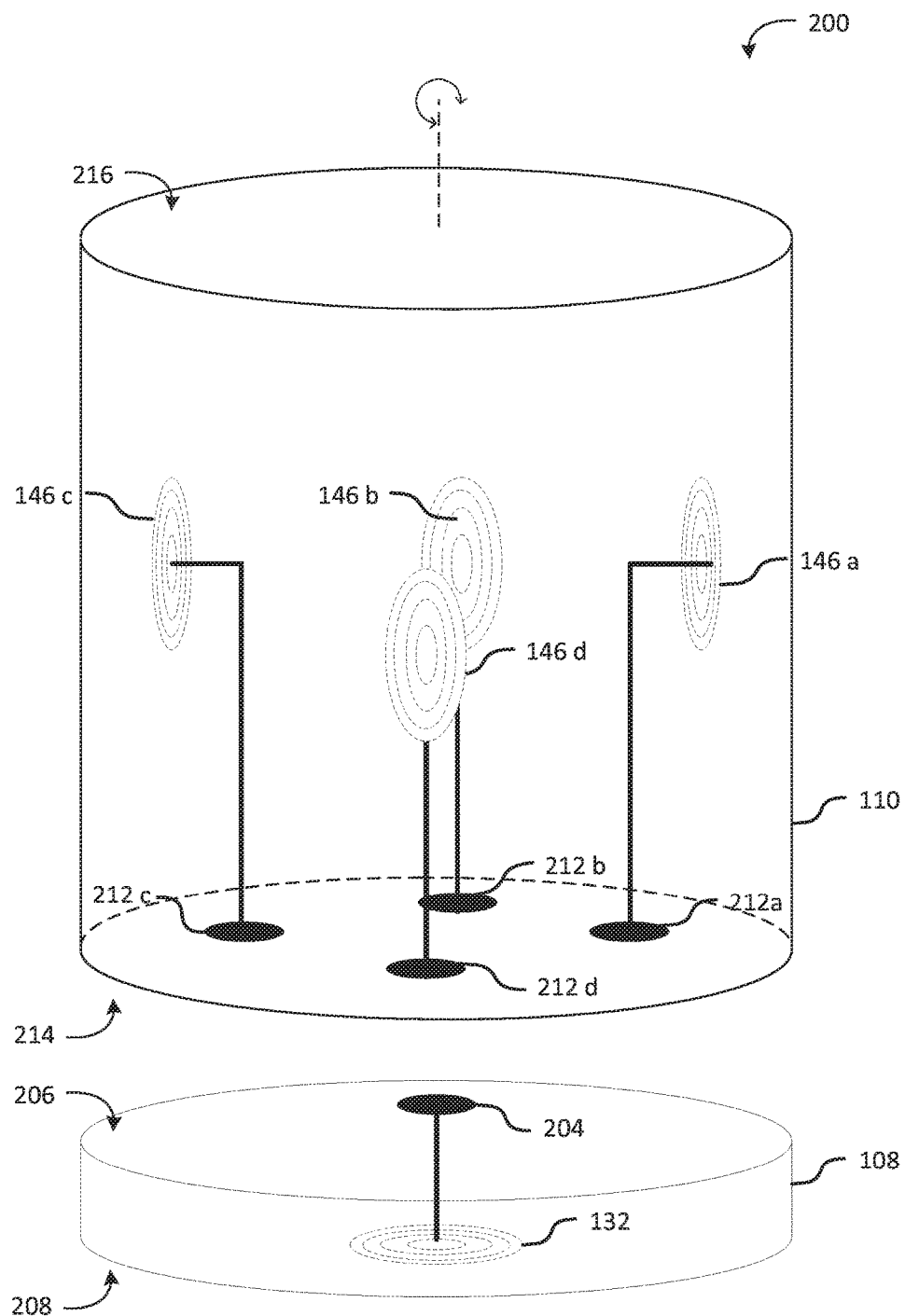
FIG. 8 depicts an example alterable token comprising a base and a rotatable body including a plurality of RFID tags in accordance with various embodiments.

FIG. 8 illustrates an example alterable token in accordance with one embodiment of the present invention. In this example, the communication interface between base 108 and rotatable body 110 is a hardwired communication by way of a plurality of electrical contacts. Referring now to FIG. 8, the alterable token in this example is in the form of an alterable RFID device 200, and is provided depicting base 108 and rotatable body 110. As discussed with reference to FIG. 1, alterable RFID device 200 may be communicatively couplable to an external device (e.g., gaming console 102 from FIG. 1) over a wired or wireless communication interface via RFID pattern 132.

Base 108 may include an RFID pattern 132 and an electrical contact 204. Base 108 may include a top portion 206 and a bottom portion 208. Bottom portion 208 may be opposite top portion 206. In some embodiments, RFID pattern 132 may include a coil or other pattern of conductive material. As will be discussed in further detail below, the conductive material of RFID pattern 132 may facilitate coupling with the external device to transfer power and/or communicate information between RFID tags 146a, 146b, 146c, or 146d of rotatable body 110 and the external device (e.g., gaming console 102). RFID pattern 132 may be electrically coupled to electrical contact 204. In some embodiments, RFID pattern 132 may be an RFID tag. Electrical contact 204 may be disposed on top portion 206 of base 108. In some embodiments, electrical contact 204 may be disposed on bottom portion 208 or other surface areas of base 108. While shown in FIG. 8 (and in other figures as well) as a cylindrical or spherical base or platform with a substantially flat upper surface (e.g., top portion 206), base 108 may take other shapes, sizes, or forms. For example, base 108 may be in the shape of a cube with a flat top portion 206, a concave top portion 206, a convex top portion 206, or otherwise contoured top portion 206.

Rotatable body 110 may include a first electrical contact 212a coupled to first RFID tag 146a and a second electrical contact 212b coupled to second RFID tag 146b. In some embodiments, rotatable body 110 may include any number of electrical contacts. The number of electrical contacts within rotatable body 110 may correspond to the number of RFID tags within rotatable body 110. For example, rotatable body 110 may include four electrical contacts (e.g., electrical contact 212a, electrical contact 212b, electrical contact 212c, and electrical contact 212d). Each of the electrical contacts (e.g., electrical contact 212a, electrical contact 212b, electrical contact 212c, and electrical contact 212d) may be coupled to an RFID tag (e.g., RFID tag 146a, RFID tag 146b, RFID tag 146c, and RFID tag 146d). For example, third electrical contact 212c may be coupled to third RFID tag 146c. Fourth electrical contact 212d may be coupled to fourth RFID tag 146d. The electrical contacts (e.g., electrical contact 212a, electrical contact 212b, electrical contact 212c, and electrical contact 212d) may be disposed on a bottom surface 214 of rotatable body 110. Bottom surface 214 of rotatable body 110 may be complementary to a top surface 216 of rotatable body 110.

RFID pattern 132 may be electrically coupled to first RFID tag 146a via first electrical contact 212a and electrical contact 204 of base 108 when rotatable body 110 is in the first position. RFID pattern 132 may be electrically coupled to second RFID tag 146b via second electrical contact 212b and electrical contact 204 of base 108 when rotatable body 110 is in the second position. RFID pattern 132 may be electrically coupled to one of any of the RFID tags (e.g., RFID tag 146a, RFID tag 146b, RFID tag 146c, and RFID tag 146d) via a corresponding one of the additional electrical contacts (e.g., electrical contact 212a, electrical contact 212b, electrical contact 212c, and electrical contact 212d) and electrical contact 202 of base 108 when rotatable body 110 is in a corresponding one of the additional positions. For example, RFID pattern 132 may be electrically coupled to third RFID tag 146c via third electrical contact 212c and electrical contact 204 of base 108 when rotatable body 110 is in the third position. RFID pattern 132 may be electrically coupled to fourth RFID tag 146d via fourth electrical contact 212d and electrical contact 204 of base 108 when rotatable body 110 is in the fourth position.

As in other embodiments depicted herein, rotatable body 110 may be configured to rotate relative to base 108 to select a particular RFID tag (e.g., one of RFID tag 146a, RFID tag 146b, RFID tag 146c, and RFID tag 146d). As such, when rotatable body 110 is in the first position, first RFID tag 146a is selected. When a particular RFID tag is selected (e.g., first RFID tag 146a when rotatable body 110 is in the first position), its corresponding electrical contact (e.g., first electrical contact 212a) comes into physical contact with electrical contact 204 of base 108, and thus, that RFID tag (e.g., first RFID tag 146a) becomes communicatively coupled with RFID pattern 132. The locking mechanism discussed above may ensure that the electrical contacts (e.g., electrical contact 212a, electrical contact 212b, electrical contact 212c, and electrical contact 212d) of the RFID tags (e.g., one of RFID tag 146a, RFID tag 146b, RFID tag 146c, and RFID tag 146d) maintain physical contact in the selected position of rotatable body 110.

In the various embodiments depicted herein (and in other embodiments as well), rotatable body 110 may be detachably mounted to top portion of base 108 (e.g., to upper base portion 124 in the embodiments illustrated in FIGS. 2-5). Rotatable body 110 may be physically combined, coupled, connected, or otherwise detachably joined to base 108 to form an alterable token 200. In some embodiments, rotatable body 110 may be detachably mounted to base 108 via a locking mechanism (not shown), such as an electromagnetic locking mechanism, physical locking mechanism (e.g., tabs, detents, pins or other physical structures) or other locking mechanism. Rotatable body 110 may also be detachably mounted to base 108 Rotatable body 110 may be detachably mounted to base 108 by a force, for example a physical or electromagnetic force, such as by way of frictional fittings, magnetic connectors, interlocking components, or other connections. In this manner, rotatable body 110 may be changed out with other rotatable bodies with similar functionality as rotatable body 110. As such, rotatable body 110 may attach to and detach from base 108 such that other rotatable bodies may attach to and detach from base 108 in a similar manner. Rotatable body 110 may be interchangeable.

As the examples depicted herein serve to illustrate, rotatable body 110 may be configured to be rotatable to a first position and a second position. In whichever manner rotatable body 110 is detachably mounted to base 108, rotatable body 110 may be configured to rotate relative to base 108. Rotatable body 110 may be configured to rotate 360-degrees left or right around a vertical axis, or it may be configured to rotate an amount less than 360°. Rotatable body 110 and/or base 108 may include a locking mechanism (not shown) to releasably lock rotatable body 110 in the first position and the second position relative to base 108. The locking mechanism may include detents, tabs, stops, magnetic connectors, or other mechanisms to allow rotatable body 110 to be releasably locked into a selected position (e.g., the first position or the second position) relative to base 108. The locking mechanism may allow rotation of rotatable body 110 relative to base 108 by the application of an external force (e.g., torque or twisting motion applied by a user). The locking mechanism may be used to maintain a selective position (e.g., the first position or the second position) when the force is removed. In some embodiments, rotatable body 110 may include a knob, handle, or other physical component (not shown) to hold for easier movement or rotation by a user of rotatable body 110. Rotatable body 110 may be configured to be rotatable to any number of positions. For example, in some embodiments, rotatable body 110 may be configured to be rotatable to four positions (e.g., a first position, a second position, a third position, and a fourth position).

Rotatable body 110 may take any form, shape, or size. In some embodiments, rotatable body 110 may be a physical representation of one or more gaming objects or characters to be included within a video game. For example, rotatable body 110 may be divided into segments and each segment as an illustration depicting its corresponding character, action figure, robot figure, vehicle, building, or other video game object. As another example, rotatable body 110 can comprise a plurality of three-dimensional character likenesses to depict the game object. These three-dimensional likenesses can, for example, be molded, carved, 3D-printed or otherwise formed on rotatable body 110.

Rotatable body 110 may physically depict more than one gaming object or character. For example, in the case of a token representing 2 characters, half of rotatable body 110 may physically depict Mario when in the first position, while the other half of rotatable body 110 may physically depict a car when in the second position. Similarly, rotatable body 110 may be configured to depict any number of different objects or characters depending on the number of positions that can be selected.

As depicted in the various examples, rotatable body 110 may include RFID tags 146. RFID tags 146 may utilize a wireless system that uses radio-frequency electromagnetic fields to transfer data to and from devices. In some embodiments, RFID tags may be powered by the electromagnetic fields used to read them or write to them. Other RFID tags may use a local power source and emit radio waves (e.g., electromagnetic radiation at radio frequencies). In some embodiments, rotatable body 110 may include any number of RFID tags. For example, rotatable body 110 may include four RFID tags (e.g., RFID tag 146a, RFID tag 146b, RFID tag 146c, and RFID tag 146d). As additional examples, rotatable body 110 may include 3 RFID tags, 5 RFID tags 6, RFID tags 7 RFID tags 8 RFID tags, or a greater number of RFID tags as may be appropriate for the application.

Each of the RFID tags (e.g., RFID tag 146a, RFID tag 146b, RFID tag 146c, and RFID tag 146d) included within rotatable body 110 may be configured to store identification information unique to a particular RFID tag. For example, first RFID tag 146a may be configured to store identification information unique to first RFID tag 146a, while second RFID tag 146b may be configured to store identification information unique to second RFID tag 146b. For example, in terms of the gaming environment, the unique identification information may include one or more attributes representing unique characters of a video game. Each of the RFID tags (e.g., RFID tag 146a, RFID tag 146b, RFID tag 146c, and RFID tag 146d) may represent different objects or characters of a video game. For example, first RFID tag 146a may store one or more attributes that represent a first character within the video game while second RFID tag 146b may store one or more attributes that represent a second character within the video game. Some of the characters represented by different RFID tags (e.g., RFID tag 146a, RFID tag 146b, RFID tag 146c, and RFID tag 146d) may be the same as or different from other characters represented by other RFID tags. The one or more attributes representing unique characters may include, for example, a visual depiction of the unique characters, a strength level associated with the unique characters, an experience level associated with the unique characters, a wealth level associated with the unique characters, a health level associated with the unique characters, a health level associated with the unique characters, achievements associated with the unique characters, weapons and ammunition levels available to the character, fuel levels or performance characteristics of the character, and other attributes or characteristics of the character Each of the RFID tags (e.g., RFID tag 146a, RFID tag 146b, RFID tag 146c, and RFID tag 146d) may be rewritable such that the one or more attributes of the unique identification information may be updated during each video game session and utilized in later game sessions. In some embodiments, rotatable body 110 may include rewritable storage that may be separate from or in addition to the RFID tags (e.g., RFID tag 146a, RFID tag 146b, RFID tag 146c, and RFID tag 146d). For example, rotatable body 110 may include memory (not shown) associated with one or more of the RFID tags (e.g., RFID tag 146a, RFID tag 146b, RFID tag 146c, and RFID tag 146d) to store the unique identification information. A first memory (not shown) may be associated with first RFID tag 146a to store the unique identification information associated with first RFID tag 146a. A second memory (not shown) may be associated with second RFID tag 146b to store the unique identification information associated with second RFID tag 146b. Alternatively, a single memory may store the unique identification information for all of the RFID tags (e.g., RFID tag 146a, RFID tag 146b, RFID tag 146c, and RFID tag 146d). In some embodiments, rotatable body 110 may include any number of storage devices to store unique identification information.

As discussed above, each of the RFID tags (e.g., RFID tag 146a, RFID tag 146b, RFID tag 146c, and RFID tag 146d) may include unique identification information, including one or more attributes representing unique objects or characters of a video game. When a user wishes to select a particular character for gameplay, the user may rotate rotatable body 110 relative to base 108 to select the desired character. When the user rotates rotatable body 110 to the first position, for example, first electrical contact 212a electrically couples with electrical contact 204 of base 108 and first RFID tag 146a becomes communicatively coupled with RFID pattern 132.

In some embodiments, base 108 may include wireless interface, such as a radio-frequency interface (not shown) to communicate with a selected RFID tag (e.g., first RFID tag 146a from the example above) of rotatable body 110. The radio-frequency interface may be an RFID interface. The physical interface between base 108 and rotatable body 110 may be configured with insulating or shielding material to shield all but the selected RFID tag (e.g., first RFID tag 146a) from communicating with RFID pattern 132. Accordingly, only a single RFID tag from rotatable body 110 may communicate with RFID pattern 132 at any given moment. In other embodiments, the RFID tags (e.g., RFID tag 146a, RFID tag 146b, RFID tag 146c, and RFID tag 146d) of rotatable body 110 may be communicatively coupled to RFID pattern 132 via a hardwired connection.

Upon connection of one of the RFID tags (e.g., e.g., first RFID tag 146*a* when rotatable body 110 is in the first position from the example above), the unique identification information associated with that RFID tag (e.g., first RFID tag 146*a*) may be communicated from that RFID tag (e.g., first RFID tag 146*a*) to RFID pattern 132. RFID pattern 132 may then communicate the unique identification information associated with that RFID tag (e.g., first RFID tag 146*a*) to the external device (e.g., gaming console 102). For example, if the user would like to include one of his or her characters into a video game he or she is playing, the user may rotate rotatable body 110 to the first position. In this manner, the stored unique identification information associated with first RFID tag 146*a* may be communicated to RFID pattern 132. RFID pattern 132 may then communicate the unique identification information to the external device (e.g., gaming console 102). As such, a graphical representation of the selected character may be depicted via monitor 104 based upon the one or more attributes representing the character via the unique identification information of first RFID tag 146*a*. All of the characteristics of the character from the last time the user included that character in the video game may be communicated to gaming console 102 and depicted via monitor 104. As known to those of skill in the art, such communications between RFID pattern 132 and the external device (e.g., gaming console 102) may take place wirelessly by information modulated onto the electromagnetic field between alterable RFID device 200 and the external device.

The external device may communicate with the RFID tags (e.g., RFID tag 146*a*, RFID tag 146*b*, RFID tag 146*c*, and RFID tag 146*d*) of rotatable body 110 via RFID pattern 132. Continuing the example above, as the user plays the video game, any new achievements, levels, health, wealth, or other attributes associated with Mario obtained and/or lost during gameplay may be communicated from gaming console 102 to RFID pattern 132. RFID pattern 132 may then communicate the updates to first RFID tag 146*a*. First RFID tag 146*a* may store the updates for later gameplay. In this manner, alterable RFID device 200 may allow for one or 2-way communication with the external device via RFID pattern 132.

If the user would like to include a car into a video game he or she is playing, the user may rotate rotatable body 110 to the second position. In this manner, the stored unique identification information associated with second RFID tag 146*b* may be communicated to RFID pattern 132. RFID pattern 132 may then communicate the unique identification information to the external device (e.g., gaming console 102). As such, a graphical representation of the car may be depicted via monitor 104 based upon the one or more attributes representing the car via the unique identification information of second RFID tag 146*b*. All of the characteristics of the car from the last time the user included the car in the video game may be communicated to gaming console 102 and depicted via monitor 104. As the user plays the video game, any new achievements, levels, health, wealth, or other characteristics or attributes associated with the car obtained and/or lost during gameplay may be communicated from gaming console 102 to RFID pattern 132. RFID pattern 132 may then communicate the updates to second RFID tag 146*b*. Second RFID tag 146*b* may store the updates for later gameplay.

In this manner, the user may select different objects or characters to include within the video game from a single object (e.g., rotatable body 110) using alterable RFID device 200 described herein.

Although the examples described above were described in terms of an alterable RFID token, including an RFID pattern to communicate with a token reader/writer and various RFID tags to represent the characters, one of ordinary skill in the art will appreciate after reading this description that data communication and information storage structures other than RFID patterns and RFID tags can be used for the alterable token. For example, while wireless communication may be desirable to allow the token to communicate to the external device, a hardwired interface (e.g., plug and socket, electrical contacts, jack, and so on) can be used to provide a hardwired interface. Additionally, other wireless communication interfaces can be provided to interface the token to the external device such as, for example, near field communications (NFC), Bluetooth low energy (BLE), Bluetooth, or a custom wireless interface. Still further, alternatives to RFID tags can be utilized for the information storage structures such as, for example, microchip technology (such as that found in smartcards, chip cards or ICCs), subscriber identity modules, memory devices, and so on.

In various embodiments described herein, information structures are associated with RFID tags 146, and RFID patterns 132, 134 are implemented as communication interfaces (whether RFID, or whether other interfaces in other embodiments) without necessarily the information structures typically provided with an RFID tag. In further embodiments, information structures can be provided in the base (e.g., with RFID pattern 132, RFID pattern 134 or otherwise) such that additional information can be communicated with the external device. In such embodiments, the external device token reader/writer can be configured to disambiguate the information and communicate with multiple RFID tags.

While various embodiments have been described above with respect to an alterable token in the environment of a gaming platform, it should be understood that they have been presented by way of example only, and not of limitation. Those of ordinary skill in the art would appreciate that some embodiments may include alterable tokens used in non-gaming contexts/environments. For example, alterable tokens can be used to provide customizable or changeable access to equipment or machinery, buildings or other physical areas, transportation mechanisms, payment or commercial transaction terminals, and so on.

Likewise, the various diagrams may depict an example architectural or other configuration for the invention(s), which is done to aid in understanding the features and functionality that can be included in the invention(s). The invention(s) are not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention(s). In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention(s) are described above in terms of various example embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention(s), whether or not such embodiments are described and whether or not such features are presented as being a part of a described embodiment. Thus, the breadth and scope of the present invention(s) should not be limited by any of the above-described example embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide example instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

We claim:

1. An alterable radio-frequency identification (RFID) device comprising:
   a base including an RFID pattern and an electrical contact electrically coupled to the RFID pattern, the base including a top portion and a bottom portion opposite the top portion, wherein the base is communicatively couplable to an external device via the RFID pattern;
   a rotatable body mounted to the top portion of the base, the rotatable body including first and second RFID tags comprising unique identification information, the body further including a first electrical contact coupled to the first RFID tag and a second electrical contact coupled to the second RFID tag, wherein the rotatable body is configured to be rotatable to a first position and a second position; and
   wherein the RFID pattern is electrically coupled to the first RFID tag via the first electrical contact and the electrical contact of the base when the rotatable body is in the first position, and the RFID pattern is electrically coupled to the second RFID tag via the second electrical contact and the electrical contact of the base when the rotatable body is in the second position.

2. The alterable RFID device of claim 1, wherein the unique identification information of the first and second RFID tags include one or more attributes representing unique characters of a video game, wherein the first RFID tag includes one or more attributes representing a first character and the second RFID tag includes one or more attributes representing a second character.

3. The alterable RFID device of claim 2, wherein the first character and the second character are different.

4. The alterable RFID device of claim 2, wherein the one or more attributes representing unique characters include a visual depiction of the unique characters, a strength level associated with the unique characters, an experience level associated with the unique characters, a wealth level associated with the unique characters, a health level associated with the unique characters, and achievements associated with the unique characters.

5. The alterable RFID device of claim 1, wherein the unique identification information is communicated from the first RFID tag to the external device via the RFID pattern when the rotatable body is in the first position.

6. The alterable RFID device of claim 1, wherein the unique identification information is communicated from the second RFID tag to the external device via the RFID pattern when the rotatable body is in the second position.

7. The alterable RFID device of claim 1, wherein the body includes a first memory associated with the first RFID tag to store the unique identification information.

8. The alterable RFID device of claim 1, wherein the body includes a second memory associated with the second RFID tag to store the unique identification information.

9. The alterable RFID device of claim 1, wherein the base is communicatively couplable to the external device over a wired or wireless communication interface.

10. The alterable RFID device of claim 1, wherein the external device includes a gaming platform.

11. The alterable RFID device of claim 1, wherein the RFID pattern includes a coil or other pattern of conductive material.

12. The alterable RFID device of claim 1, further comprising:
    a locking mechanism to releasably lock the rotatable body in the first position or the second position relative to the base.

13. The alterable RFID device of claim 12, wherein the locking mechanism includes one or more of a detent, a tab, and a stop.

14. The alterable RFID device of claim 1, wherein the rotatable body further comprises additional RFID tags comprising unique identification information.

15. The alterable RFID device of claim 14, wherein the rotatable body further comprises additional electrical contacts coupled to the additional RFID tags.

16. The alterable RFID device of claim 15, wherein the rotatable body is configured to be rotatable to additional positions.

17. The alterable RFID device of claim 16, wherein the RFID pattern is electrically coupled to one of the additional RFID tags via a corresponding one of the additional electrical contacts and the electrical contact of the base when the rotatable body is in a corresponding one of the additional positions.

18. An alterable token comprising:
    a base including a communication interface and an electrical contact electrically coupled to the communication interface, wherein the base is communicatively couplable to an external device via the communication interface;
    a rotatable body detachably coupled to the base, the rotatable body including first and second identification structures comprising unique identification information, the body further including a first electrical contact coupled to the first identification structure and a second electrical contact coupled to the second identification structure, wherein the rotatable body is configured to be rotatable to a first position and a second position; and wherein the communication interface is electrically coupled to the first identification structure via the first electrical contact and the electrical contact of the base when the rotatable body is in the first position, and the communication interface is electrically coupled to the second identification structure via the second electrical contact and the electrical contact of the base when the rotatable body is in the second position.

19. The alterable token of claim 18, wherein the external device includes a token reader.

20. The alterable token of claim 18, wherein the communication interface is a radio-frequency identification pattern.

21. The alterable token of claim 20, wherein the radio-frequency identification pattern includes a coil or other pattern of conductive material.

22. The alterable token of claim 18, wherein the first and second identification structures are radio-frequency identification tags.

23. The alterable token of claim 18, wherein the unique identification information of the first and second identification structures include one or more attributes representing unique characters of a video game, wherein the first identification structure includes one or more attributes representing a first character and the second identification structure includes one or more attributes representing a second character.

24. The alterable token of claim 23, wherein the first character and the second character are different.

25. The alterable token of claim 23, wherein the one or more attributes representing unique characters include a visual depiction of the unique characters, a strength level associated with the unique characters, an experience level associated with the unique characters, a wealth level associated with the unique characters, a health level associated with the unique characters, and achievements associated with the unique characters.

26. The alterable token of claim 18, wherein the unique identification information is communicated from the first identification structure to the external device via the communication interface when the rotatable body is in the first position.

27. The alterable token of claim 18, wherein the unique identification information is communicated from the second identification structure to the external device via the communication interface when the rotatable body is in the second position.

28. The alterable token of claim 18, wherein the body includes a first memory associated with the first identification structure to store the unique identification information.

29. The alterable token of claim 18, wherein the body includes a second memory associated with the second identification structure to store the unique identification information.

30. The alterable token of claim 18, wherein the base is communicatively couplable to the external device over a wired or wireless communication interface.

31. The alterable token of claim 18, wherein the external device includes a gaming platform.

32. The alterable token of claim 18, further comprising:
a locking mechanism to releasably lock the rotatable body in the first position or the second position relative to the base.

33. The alterable token of claim 32, wherein the locking mechanism includes one or more of a detent, a tab, and a stop.

34. The alterable token of claim 18, wherein the rotatable body further comprises additional identification structures comprising unique identification information.

35. The alterable token of claim 34, wherein the rotatable body further comprises additional electrical contacts coupled to the additional identification structures.

36. The alterable token of claim 35, wherein the rotatable body is configured to be rotatable to additional positions.

37. The alterable token of claim 36, wherein the communication interface is electrically coupled to one of the additional identification structures via a corresponding one of the additional electrical contacts and the electrical contact of the base when the rotatable body is in a corresponding one of the additional positions.

38. An alterable token comprising:
a base including a first radio-frequency identification (RFID) pattern within a lower base portion, a second RFID pattern within an upper base portion, and a communication interface communicatively coupling the first RFID pattern and the second RFID pattern;
a rotatable body coupled to the base, the rotatable body including first and second RFID tags comprising unique identification information, wherein the rotatable body is configured to be rotatable to a first position and a second position; and
wherein the first RFID tag is communicatively couplable to an external device via the first and second RFID patterns when the first RFID tag is within proximity to the second RFID pattern in the first position, and the second RFID tag is communicatively couplable to the external device via the first and second RFID patterns when the second RFID tag is within proximity to the second RFID pattern in the second position.

39. The alterable token of claim 38, wherein the external device includes a token reader.

40. The alterable token of claim 38, wherein the external device includes a gaming platform.

41. The alterable token of claim 38, wherein the first RFID tag includes information structures to store the unique identification information.

42. The alterable token of claim 38, wherein the second RFID tag includes information structures to store the unique identification information.

43. The alterable token of claim 38, wherein the alterable token is communicatively couplable to the external device over a wired or wireless communication interface.

44. The alterable token of claim 38, wherein the first RFID tag is wirelessly coupled to the second RFID pattern in the first position.

45. The alterable token of claim 38, wherein the second RFID tag is wirelessly coupled to the second RFID pattern in the second position.

46. The alterable token of claim 38, wherein the communication interface includes a single conductor or a shielded conductor.

47. The alterable token of claim 46, wherein the single conductor includes copper, silver, or other conductive wire.

48. The alterable token of claim 38, wherein the rotatable body is positioned over the upper base portion.

49. The alterable token of claim 38, wherein the unique identification information of the first and second RFID tags include one or more attributes representing unique characters of a video game, wherein the first RFID tag includes one or more attributes representing a first character and the second RFID tag includes one or more attributes representing a second character.

50. The alterable token of claim 49, wherein the first character and the second character are different.

51. The alterable token of claim 49, wherein the one or more attributes representing unique characters include a visual depiction of the unique characters, a strength level associated with the unique characters, an experience level associated with the unique characters, a wealth level associated with the unique characters, a health level associated with the unique characters, and achievements associated with the unique characters.

52. The alterable token of claim 38, wherein the rotatable body further comprises additional RFID tags comprising unique identification information.

53. The alterable token of claim 52, wherein the rotatable body is configured to be rotatable to additional positions.

54. The alterable token of claim 53, wherein the additional RFID tags are communicatively coupled to the external device via the first RFID pattern and the second RFID pattern when the additional RFID tags are within proximity to the second RFID pattern in the additional positions.

* * * * *